Oct. 29, 1963

H. H. SANDER ETAL 3,108,466

BLAST YIELD METER

Filed Feb. 24, 1961

INVENTORS:
Howard H. Sander
Maynard Cowan, Jr.
Stuart C. Hight
BY

Attorney

United States Patent Office 3,108,466
Patented Oct. 29, 1963

3,108,466
BLAST YIELD METER
Howard H. Sander and Maynard Cowan, Jr., Albuquerque, N. Mex., and Stuart C. Hight, South Orange, N.J., assignors, by mesne assignments, to the United States of America as represented by the United States Atomic Energy Commission
Filed Feb. 24, 1961, Ser. No. 91,557
10 Claims. (Cl. 73—35)

This invention is generally related to the field of pressure-sensitive devices and is more particularly concerned with an instrument of this character designed to detect the occurrence of nuclear or other explosions and to indicate the energy release or yield resulting from such explosions.

Beginning with the days of Hiroshimo and Nagasaki, scientists and technicians have measured and studied the characteristics and effects of nuclear detonations. Perhaps the most highly publicized attribute of such detonations is their so-called blast yield, that is, the energy released in the form of strong pressure waves in the surrounding atmosphere, usually expressed in kilotons of high explosive equivalent. This yield has been measured in various ways. For example, one can investigate the passive effects of a blast. From an examination of the deformation or other damage to affected objects at known distances from the point of explosion it is possible to calculate blast yield with the aid of so-called pressure-distance curves. In a more refined technique a microbarograph recorder positioned at a known distance from the explosion indicates the time of arrival of a pressure wave and its peak values. This method requires extensive auxiliary electronic equipment and fore-knowledge of the detonation as well as a skilled operator to read and interpret the results. Still another method of yield determination involves radio chemical analysis of samples taken from the atomic cloud associated with a nuclear explosion. Here the final results are developed through sophisticated laboratory techniques.

All these methods are costly, time-consuming, and cumbersome. All of them assume that the nuclear event is anticipated or known to have occurred at a particular location, and all require trained operators and analysts to obtain and interpret the desired information. However, today not only our scientists but also our military establishment and civil defense organizations desire immediate means for detecting nuclear explosions in given areas and furnishing indications of their magnitude. The prior art techniques described above will not solve this problem.

It is clear that a device for the purpose outlined must first of all be adapted to field use. It must therefore be small in size and easily portable, with a self-contained power source and operable without the aid of auxiliary equipment or other data. It must also be effective in the hands of relatively untrained military and civilian personnel who have need of immediate information. Thus it must be ready to function at all times and must give an automatic and direct indication of yield. Since it must be able to measure the results not only of our own nuclear devices but also those of hostile origin, it must function independently of its distance from the point of detonation of the nuclear device. Finally, it must be of sufficiently simple construction that it can be manufactured in quantity at relatively low cost.

The general object of this invention is, therefore, to devise an instrument which detects and measures the yield of a nuclear explosion consistent with the above requirements.

The device to be described depends fundamentally upon the nature of the pressure wave produced by a nuclear detonation or, for that matter, any explosion. In a homogeneous atmosphere this wave is characterized primarily by an abrupt increase in pressure, called a positive phase, followed by a pressure decrease below the ambient level called a negative phase, with a return to ambient pressure. These initial positive and negative phases are usually succeeded by a train of pressure variations of rapidly decaying amplitude until a stable ambient atmospheric pressure is restored. Such a wave is propagated to indefinite distances in the surrounding atmosphere. Its characteristics will be illustrated and explained more fully below in connection with the detailed description.

In the present application we shall concern ourselves with the initial positive phase and the initial negative phase invariably occurring thereafter. The inventors have discovered that for a homogeneous atmosphere the time duration of this negative phase is dependent upon the magnitude of the explosion and except for some minor variations is independent of all else. This constant relationship between the time duration of the negative phase and the magnitude of the explosion provides the key to the present invention. For it means that if one can measure this time and record the result in suitably converted units, the desired information is given at once.

It is therefore a more specific object of this invention to provide means for sensing the occurrence of the first negative phase of a pressure wave, measuring its time duration, and directly indicating the explosive yield corresponding to such time duration.

The heart of the device is a sensitive pressure transducer which provides suitable contact closures in the presence of positive and negative differential pressures of at least predetermined magnitude. A system of relays actuated in response to the operation of the pressure transducer "arms" the device on the occurrence of a positive pressure phase, energizes a timing motor from a self-contained power source at the beginning of a negative pressure phase closely following this positive pressure phase, and stops the timing motor at the conclusion of the negative pressure phase. Coupled with the timing motor is a dial which directly indicates the yield of the explosion corresponding to the elapsed time. In order that the operator be aware that an explosion has occurred, an audible tone signal occurs coincident with the end of the negative pressure phase. The timing motor is automatically locked "off" after the first negative phase of a true blast wave has passed to eliminate false readings from further pressure oscillations.

A better understanding of the invention may be had and other objects will become apparent upon reading the following more detailed description in conjunction with the attached drawings, in which.

Figure 1:
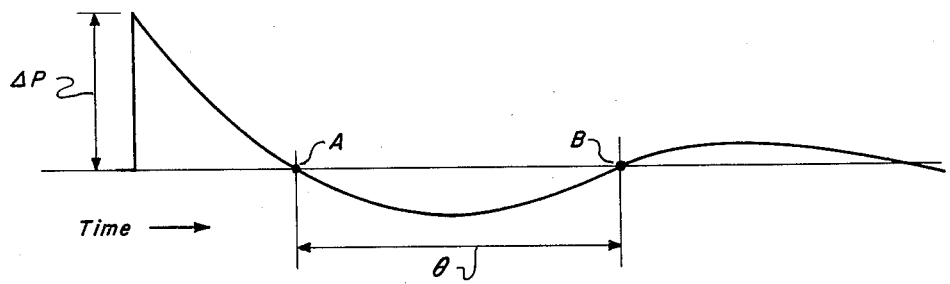
FIG. 1 is a typical shock wave form from a nuclear detonation.

In FIG. 1, the first positive pressure phase and the first negative pressure phase of a blast wave are illustrated as they might be sensed at close range from the point of detonation of a nuclear device. $\Delta P$ represents the peak overpressure above ambient, points A and B define the beginning and end of the negative phase at zero overpressure, and $\theta$ represents the time duration of the negative phase. For any given explosive yield, $\Delta P$ will vary with the distance from the point of detonation, but the time $\theta$ remains nearly constant with increasing distance.

For a detonation near or on the earth's surface at any distance, $W = k\theta^3$ where W is the explosive yield, $\theta$ is the negative phase time duration, and $k$ is a proportionality constant. Measurements of actual pressure-time records from nuclear detonations have shown that for a limited range $k \cong 0.50$. From this mathematical relation, one may thus calculate the yields corresponding to any given range of values of time $\theta$ and display the results in comparative form.

Naturally, a true atmosphere is not homogeneous. There may exist meteorological conditions between the detonation and the point of pressure wave detection which introduce interference phenomena. These phenomena will affect the negative phase time to an extent dependent upon the range and the yield of the detonation. Therefore error factors must be introduced to allow for such variations. However, it can be demonstrated that within practical range limitations, the negative phase duration may be relied upon as a reasonably accurate measure of yield, and thus remains the essential parameter upon which the instrument of this invention relies for its results.

Figure 2:
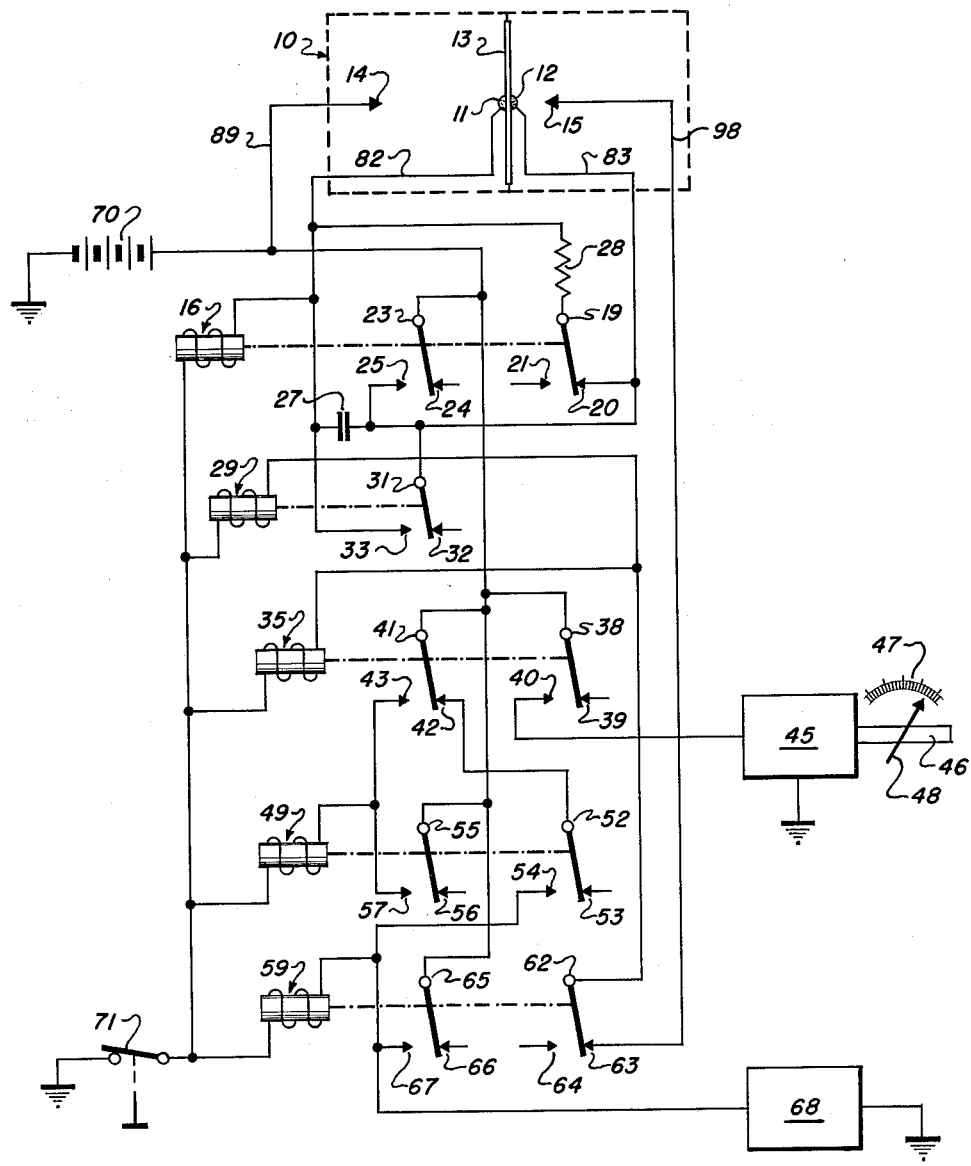
FIG. 2 is a circuit diagram illustrating the electrical features of the device.

FIG. 2 shows the electrical features of a device in a "ready" state operable in accordance with the negative phase duration principle. At the top of the schematic there is shown in dotted outline a pressure transducer 10 including essential electrical connections. A pair of contact buttons 11 and 12 are mounted in the center of movable diaphragm 13 on either side thereof. Associated therewith are positive pressure phase contact 14 and negative pressure phase contact 15, consisting conveniently of adjustable screws, so that continuity can be established, on the one hand, between positive contact button 11 and positive pressure phase contact 14 and, similarly, between negative contact button 12 and negative pressure phase contact 15 in response to deflection of diaphragm 13.

From the above described electrical elements of the pressure transducer, connections are made to a system of relays. Contact button 11 is connected to the positive coil terminal of relay 16, which includes in cooperating relation normally closed contacts 19 and 20, and normally open contact 21 and, in similar relation, normally closed contacts 23 and 24, and normally open contact 25.

A delay reset capacitor 27 is connected between the positive coil terminal of relay 16 and contact 25. A separate current path is established from one terminal of capacitor 27 through resistor 28 to contact 19 and from contact 20 to the opposite terminal of capacitor 27 to form a capacitor discharge path with contacts 19 and 20 in a closed position.

Through a pair of normally closed relay contacts to be described below, negative pressure phase contact 15 is connected to the positive coil terminal of relay 29, which includes in cooperating relation normally closed contacts 31 and 32 and normally open contact 33. One terminal of capacitor 27 is connected to contact 31 and the other is connected to contact 33.

Continuity is also established through the same normally closed contacts supplying power to relay 29 between negative pressure phase contact 15 and the positive coil terminal of relay 35, which includes in cooperating relation normally closed contacts 38 and 39 and normally open contact 40 and, in similar relation, normally closed contacts 41 and 42 and normally open contact 43. Contact 40 is connected to timing motor 45, with which is associated indicator 46 having a scale 47 and pointer 48.

Contact 43 is connected to the positive coil terminal of relay 49, which includes in cooperating relation normally closed contacts 52 and 53 and normally open contact 54 and, in similar relation, normally closed contacts 55 and 56 and normally open contact 57. Contact 42 of relay 35 is connected to contact 52 of relay 49.

Contact 54 of relay 49 is connected to the positive side of relay 59, including in cooperating relation normally closed contacts 62 and 63 and normally open contact 64 and, in similar relation, normally closed contacts 65 and 66 and normally open contact 67. Contact 67 is connected to warning tone circuit 68. Continuity between negative pressure phase contact 15 and the positive coil terminal of relays 29 and 35 is seen to be established through normally closed contacts 62 and 63 of relay 59.

Positive pressure phase contact 14 is connected to the positive coil terminal of power source 70, which is also connected to contact 23 of relay 16, to contacts 38 and 41 of relay 35, to contact 55 of relay 49, and to contact 65 of relay 59. The negative coil terminals of each of relays 16, 29, 35, 49, and 59 are connected to ground through reset switch 71.

Figure 3:
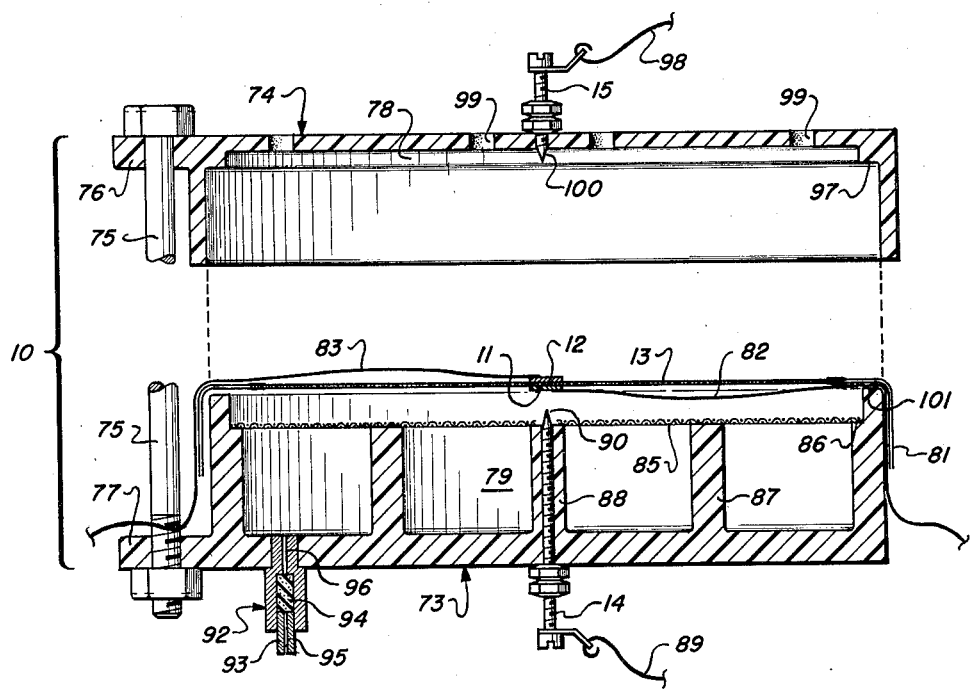
FIG. 3 is an exploded sectional view of the pressure transducer.

The details of pressure transducer 10 can be more readily seen in FIG. 3. The outer housing of transducer 10 consists of a cylindrical base 73 and a matching cover 74 which is adapted to fit slidably over base 73. In assembled position base 73 and cover 74 are held in rigid relation by a plurality of bolts 75 inserted through cooperating lugs 76 and 77. Base 73 and cover 74 are separated internally by diaphragm 13 into two pressure chambers 78 and 79. Diaphragm 13 may consist of a very thin sheet of metal or a stretched plastic film, clamped in place, and held in constant radial tension by rubber rim 81 which can be vulcanized to diaphragm 13 and stretched over transducer base 73. Rim 81 will be maintained in position through the pressure of cover 74 as assembled. Contact buttons 11 and 12 referred to in connection with FIG. 2 are seen to be mounted on either side of diaphragm 13 at its center. Suitable electrical leads 82 and 83 establish continuity between contact buttons 11 and 12 and the associated relay circuitry. It is understood that there will be sufficient clearance between base 73 and cover 74 to provide for rim 81 and leads 82 and 83. The only air inlet into pressure chamber 79 is through a bleed plug to be described below.

Within base 73 a so-called limit grill 85 which may typically be constructed of steel screening is positioned within chamber 79 beneath and closely adjacent diaphragm 13. The periphery of grill 85 rests on shoulder 86 along the cylindrical wall of base 73. Additional internal support for limit grill 85 is provided by annular ridge 87 extending from the bottom of base 73 and by center support 88 also extending therefrom.

The bottom of base 73 is centrally drilled and tapped to receive positive pressure phase contact 14 to which is attached electrical lead 89. Positive pressure phase contact 14 terminates in needle point 90 provided with suitable plating, for example, gold, in order that the formation of oxides does not have a harmful effect upon electrical conductivity. The clearance between point 90 and contact button 11 is adjustable to within very fine tolerances.

The bottom of base 73 is also drilled and tapped to receive bleed plug 92. Adjustable screw 93 within plug 92 is adapted to exert compressive force on cylindrical sponge rubber block 94. Block 94 controls the passage of outside air through axial hole 95 in screw 93, and axial hole 96 in bleed plug 92 into inner chamber 79. Bleed plug 92 thus serves to bring the pressure within chamber 79 into agreement with the outside ambient pressure at a suitable leak rate. As will be seen in connection with the operation of this device, this leak rate is made sufficiently slow so that the rapidly occurring positive and negative overpressures to be measured will not affect the necessary reference pressure within chamber 79.

Cover 74 on the opposite side of diaphragm 13 is also provided with a peripheral shoulder 97 which in an assembled position bears against the upper rim 101 of base 73. Cover 74 serves to limit maximum deflection in a negative pressure direction. The top of cover 74 is provided with a plurality of pressure inlet holes 99 designed to admit shock overpressures into chamber 78.

The top of cover 74 is also centrally drilled and tapped to receive negative pressure phase contact 15 having suitably plated point 100 adjustably spaced from contact button 12. Electrical lead 98 is attached to negative pressure phase contact 15.

Optionally, pressure transducer 10 as shown may be encased within a separate outer housing (not shown) which may be drilled to receive a perforated metal disk behind which cheesecloth or other shock absorbent material could be positioned by suitable metal or other screening. This constitutes a means which might be adopted to protect diaphragm 13 by damping the peak overpressures to be experienced.

Timing motor 45 (FIG. 2) may consist of any electrically operable means for shaft rotation, for example, an escapement regulated D.C. motor whose shaft directly controls the motion of pointer 48 across scale 47 of indicator 46. Scale 47 may conveniently be scribed in seconds or suitable divisions thereof as well as in kilotons or other explosive yield units, conveniently compressed by logarithmic scaling or the like. In a practical device it will be desirable to provide reset means for indicator 46 which may be either electrical or of a mechanical clutching variety.

The warning tone circuit 68 of FIG. 2 may include, for space considerations, a transistorized audio oscillator designed to drive a miniature speaker to produce a tone or sound adapted to attract immediate attention.

The entire assembly including the relay system, transducer 10, timing motor 45, indicator 46, warning tone circuit 68, and power source 70 is easily housed in a conveniently portable hand-held instrument.

The operation of the electrical circuitry is generally as follows. Upon occurrence of a positive phase of overpressure of predetermined magnitude, contact button 11 moves into contact with positive pressure phase contact 14. (Contact button 11 and positive pressure phase contact 14 may, therefore, be conveniently regarded together as the "positive phase" contacts.) Relay 16 is thereby energized from power source 70 and is also electrically latched through its contacts 23 and 25, providing a current path to relay 16 through delay reset capacitor 27. However, capacitor 27 does not begin charging until contact button 11 and positive pressure phase contact 14 open, which occurs when the positive pressure phase returns near or to ambient pressure. The exact opening pressure depends upon the sensitivity of the diaphragm and the setting of positive pressure phase contact 14. Capacitor 27 then begins charging through the resistance of relay 16 (which may conveniently be about 5000 ohms), and maintains contacts 23 and 25 closed during the charging time. During this period the device is "armed." As will be seen, timing motor cannot operate except when relay contacts 23 and 25 are closed. If a negative pressure phase does not occur within the time specified by the resistance of relay 16 and the capacitance of capacitor 27, for example, about 10 seconds for a capacitance of 2000 microfarads, relay 16 then opens. Capacitor 27 discharges through resistor 28 and normally closed contacts 19 and 20. The circuit is thus automatically reset and is again awaiting arrival of another positive pressure pulse. Resistor 28, 300 ohms in an actual unit, is placed in the discharge path of capacitor 27 in order to prevent burning of the contacts of relay 16.

Upon occurrence of a negative phase of overpressure of predetermined magnitude, contact button 12 moves into contact with negative pressure phase contact 15. (Contact button 12 and negative pressure phase contact 15 may, therefore, be conveniently regarded together as the "negative phase" contacts.) If a negative pressure phase follows a positive pressure phase within a specified time, i.e., less than the charging time of capacitor 27, relay 29 is energized by current through contacts 23 and 25 of relay 16 which are still closed, through contact button 12 which has closed with negative pressure phase contact 15, through contacts 62 and 63 of relay 59, and then to relay 29. Contacts 31 and 33 of relay 29 then shortcircuit capacitor 27, allowing relay 16 to be electrically latched.

Relay 35 is also energized in response to the negative phase closure of contact button 12 and negative pressure phase contact 15 through contacts 62 and 63 of relay 59 and closed contacts 23 and 25 of relay 16. In consequence, contacts 38 and 40 are closed and similarly contacts 41 and 43 are closed. Closed contacts 38 and 40 supply power to timing motor 45 which in turn operates pointer 48 along indicator scale 47 and the timing of the negative phase duration begins.

Relay 49 is now energized through closed contacts 41 and 43 of relay 35, to close contacts 52 and 54 and similarly to close contacts 55 and 57. Relay 49 is now electrically latched through its own contacts 55 and 57. Contacts 52 and 54 of relay 49 are closed but no current flows through them as yet since power to them is to come through contacts 41 and 42 of relay 35 which are now open. When the negative pressure phase returns very near or to ambient, contact button 12 and negative pressure phase contact 15 open, relay 35 opens, timing motor 45 stops, and movement of pointer 48 on indicator scale 47 ceases. An operator can now read directly from scale 47 the explosive yield corresponding to the elapsed time measured by the operation of timing motor 45.

Current now flows from contacts 41 and 42 of relay 35 through closed contacts 52 and 54 of relay 49, which is still electrically latched closed, to relay 59, which is thus energized and latched through its contacts 65 and 67. This energizes warning tone circuit 68 which gives an audible signal at the instant of opening of contact button 12 and negative pressure phase contact 15 to call attention to anyone in the vicinity that the device has received and measured a blast wave.

Contacts 62 and 63 of relay 59 are held open since relay 59 remains electrically latched shut and thus if continuing oscillations of the pressure wave should cause further negative phase contact closure, no further current can flow to timing motor 45. When the normally closed reset switch 71 is momentarily opened, relays 49 and 59 which are still latched shut, then open and the circuit is ready for another operation.

It can now be seen that the positive phase of a blast wave "arms" the instrument through closure of contacts 23 and 25 of relay 16, readying it to receive and measure the duration of the first negative phase of the blast wave. If a negative phase does not arrive soon enough thereafter, contacts 23 and 25 will open and timing motor 45 cannot be operated. This then prevents random operation of the device which might otherwise be caused by vibration, temperature changes, gusts of wind, and the like, which do not produce the proper sequence of positive and negative overpressures. Similarly, at the conclusion of a properly timed negative phase, the opening of contacts 62 and 63 of relay 59 automatically locks timing motor 45 "off" so that continuing pressure oscillations of any sort whether or not produced by the blast wave are not added to the initial reading.

The heart of the instrument is pressure transducer 10. When a positive pressure pulse arrives diaphragm 13 is deflected toward positive pressure phase contact 14 by the differential pressure existing between chambers 78 and 79. The minimum positive overpressure necessary to close contact button 11 and positive pressure phase contact 14 depends upon the sensitivity of the diaphragm material and the adjustment of positive pressure phase contact 14. Practically speaking, positive contact closure may be adjusted to occur at about 0.1 p.s.i.

Naturally, it would be desirable for perfect timing to have diaphragm 13 close contact button 12 and negative pressure phase contact 15 at the instant of arrival of the negative pressure pulse, but, of course, some finite differential pressure is always required to deflect diaphragm 13. Consequently, negative phase contact closure cannot be achieved exactly at the point of zero differential pressure. Therefore, as in the case of positive phase contact closure, some specific minimum pressure must be established to effect negative phase contact closure. A practical value for this minimum pressure is a setting of about 0.01 p.s.i. as the closing pressure for negative phase contacts 12 and 15.

These low closing pressures are achievable with a device constructed in accordance with this invention. It is necessary to position diaphragm 13 accurately between pressure phase contacts 14 and 15. This may be achieved through the use of rubber tension rim 81 or other suitable means for holding diaphragm 13 in constant radial tension.

The pressure pulse from a nuclear explosion may be expected to decay in amplitude with increasing distance from ground zero. Therefore, the more sensitive the positive pressure setting and the more sensitive the diaphragm itself, the farther away from an explosion of given yield the instrument can be expected to work, bearing in mind of course that atmospheric variations will affect the useful range of the instrument in any given case.

An essential feature of pressure transducer 10 is bleed plug 92 whose leak rate is adjusted by means of screw 93. Since ambient pressure changes with atmospheric conditions and altitude, a fixed reference pressure would lead to inaccuracies. The device would of course function perfectly with a fixed leak rate through bleed plug 92. It is important only to insure that the leak rate is slow enough so that the reference pressure cannot follow the positive and negative overpressures experienced in chamber 78 on the opposite side of diaphragm 13 However, variation in range of operation and expected explosive yields would change this time factor and thus make adjustability of the leak rate advantageous.

It is now evident that the objects for which this device was designed have been achieved. All its elements can be reduced to conveniently portable size and weight. The only required power source is a self-contained and easily replaceable storage battery. The device stands ready to function at any moment regardless of its location with respect to a possible explosion. Since it is measuring, in essence, a time interval which is independent, broadly speaking, of the distance from point of explosion, the results are read directly without any further calculation and without any conversion or interpretation. Thus any individual of normal intelligence may operate the device without previous training. This is, of course, a feature of critical importance for widespread military and civilian use. It will also be apparent that there is no element in the entire instrument which involves any difficult problems in design or manufacture and thus low cost quantity production should be easily obtainable.

It is worth noting that this device is inherently a means for detecting the occurrence of a nuclear or other explosion as well as a means for measuring and indicating its magnitude. Within the scope of this invention it would be a simple matter to eliminate timing motor 45 and indicator 46 and preserve warning tone circuit 68 so that the operation of the device would depend solely upon the occurrence of positive and negative overpressures in proper sequence and of at least some preselected minimum magnitude, thus insuring the occurrence of a nuclear or other high yield explosion. Perhaps for certain purposes, both military and civilian, detection alone would be sufficient to dictate certain action.

In addition, those skilled in the art will have no difficulty in providing capacitor charging or other means for making the "arming" of the device dependent not only upon the occurrence of a negative phase closely following a positive phase, but also upon the initial occurrence of a positive phase of a preselected minimum time duration. This will enable the device to discriminate against nonnuclear explosions productive of positive and negative overpressures of shorter duration than those characteristic of a nuclear blast.

It should now be evident that many variations of the electrical and mechanical features described and illustrated in the preferred embodiment will be possible without departing from the scope of this invention. Such features are therefore to be regarded as purely exemplary and not as limitation.

What is claimed is:

1. A device for automatically measuring the yield of an explosion productive of a pressure wave characterized by a phase of positive overpressure followed closely by a phase of negative overpressure comprising pressure sensitive means responsive to positive and negative overpressures of at least predetermined magnitudes, means for timing the duration of said negative pressure phase, said timing means being selectively responsive to the operation of said pressure sensitive means, and means for directly indicating the explosive yield corresponding to said time duration.

2. A device for automatically measuring the yield of an explosion productive of a pressure wave characterized by a phase of positive overpressure followed closely by a phase of negative overpressure comprising pressure sensitive means responsive to positive and negative overpressures of at least predetermined magnitudes, means for timing the duration of said negative pressure phase, said timing means being selectively responsive to the operation of said pressure sensitive means, means for directly indicating the explosive yield corresponding to said time duration, and means for providing an audible signal coincident with the termination of said negative pressure phase.

3. A device for automatically measuring the yield of an explosion productive of a pressure wave characterized by a phase of positive overpressure followed closely by a phase of negative overpressure comprising pressure sensitive means responsive to positive and negative overpressures of at least predetermined magnitudes, means for timing the duration of said negative pressure phase, said timing means being selectively responsive to the operation of said pressure sensing means, means connected to said timing means for directly indicating the explosive yield corresponding to said time duration, means for providing an audible signal coincident with the termination of said negative pressure phase, and means responsive to the operation of said signal means for thereafter disabling said timing means.

4. A device for automatically measuring the yield of an explosion productive of a pressure wave characterized by a phase of positive overpressure followed closely by a phase of negative overpressure comprising pressure sensitive means responsive to positive and negative pressures of at least predetermined magnitudes, means for timing the duration of said negative pressure phase, said timing means being operatively responsive to the sensing of said positive and negative pressures in prescribed time relation, means connected to said timing means for directly indicating the explosive yield corresponding to said time duration, means for providing an audible signal coincident with the termination of said negative pressure phase, and means responsive to the operation of said signal means for thereafter disabling said timing means.

5. A device for automatically measuring the yield of an explosion productive of a pressure wave characterized by a phase of positive overpressure followed closely by a phase of negative overpressure comprising pressure sensitive means responsive to positive and negative overpressures of at least predetermined magnitudes, a power source, means for timing the duration of said negative pressure phase, circuit means operatively connecting said power source and timing means in selective response to the operation of said pressure sensing means, means connected to said timing means for directly indicating the explosive yield corresponding to said time duration, an audible warning circuit, circuit means for energizing said warning circuit from said power source coincident with the termination of said negative pressure phase, and means responsive to the operation of said warning circuit for thereafter disabling said timing means.

6. A device for automatically measuring the yield of an explosion productive of a pressure wave characterized by a phase of positive overpressure followed closely by a phase of negative overpressure comprising pressure sensitive means responsive to positive and negative overpressures of at least predetermined magnitudes, a power source, means for timing the duration of said negative pressure phase, circuit means operatively connecting said power source and timing means responsive to the sensing of said positive and negative pressures in prescribed time relation, means connected to said timing means for directly indicating the explosive yield corresponding to said time duration, an audible warning circuit, circuit means for energizing said warning circuit from said power source coincident with the termination of said negative pressure phase, and means responsive to the operation of said warning circuit for thereafter disabling said timing means.

7. A device for automatically measuring the yield of an explosion productive of a pressure wave characterized by a positive pressure phase followed closely by a negative pressure phase comprising pressure switching means including a pair of positive phase contacts and a pair of negative phase contacts adapted to be closed respectively in response to a positive or negative overpressure of predetermined magnitude, a first relay having a first and a second pair of contacts adapted to be closed responsive to the closing of said positive phase contacts, capacitive means responsive to the opening of said positive phase contacts for maintaining said first relay energized through its first pair of contacts for a predetermined time, the second pair of contacts of said first relay providing a discharge path for said capacitive means, a second relay having a pair of contacts adapted to be closed through the first pair of contacts of said first relay in response to the closure of said negative phase contacts within said predetermined time, the contacts of said second relay providing a current path for electrically latching said first relay in an energized position through the first pair of contacts thereof, a third relay having a first and a second pair of contacts adapted to be closed through the first pair of contacts of said first relay in response to the closure of said negative phase contacts, a timing motor operable in response to the closure of the first pair of contacts of said third relay, a fourth relay having a first and a second pair of contacts and adapted to be energized in response to the closure of the second pair of contacts of said third relay, said fourth relay being electrically latched thereafter through its first pair of contacts, a fifth relay having a first and a second pair of contacts and adapted to be energized through the second pair of contacts of said fourth relay in response to the opening of the second pair of contacts of said third relay, said fifth relay being electrically latched thereafter through its first pair of contacts, the closure of its second pair of contacts interrupting the energizing current path for the first, second and third relays, a warning tone circuit energized through the first pair of contacts of said fifth relay, means responsive to the operation of the timing motor for directly indicating the yield of the explosion, and means for deenergizing the remaining latched relays.

8. A device as in claim 6 wherein said pressure-sensitive means comprises a pair of fixed electrical contacts mounted in adjustably spaced relation, a pressure-sensitive diaphragm mounted between said fixed contacts, each side of said diaphragm bearing an electrical contact movable therewith in axial alignment with said fixed contacts, a reference pressure chamber in pressure transmitting relation to one side of said diaphragm, means for adjustably compensating said reference chamber for changes in ambient pressure, instantaneous pressure inlet means in pressure-transmitting relation to the opposite side of said diaphragm, said diaphragm being deflectable in response to the pressure differential between said two sides, and electrical circuit means connected to said fixed and movable contacts.

9. Pressure-sensitive means as in claim 8 including means attached to the periphery of said diaphragm adapted to exert constant radial tension thereon.

10. Pressure-sensitive means as in claim 8 wherein said fixed contacts are sharpened to reduce the pressure-receiving areas thereof to a predetermined extent.

References Cited in the file of this patent
UNITED STATES PATENTS

| | | |
|---|---|---|
| 1,861,021 | Martin | May 31, 1932 |
| 1,986,479 | Lowe et al. | Jan. 1, 1935 |
| 2,791,288 | Meier | May 7, 1957 |
| 2,850,899 | Clarke | Sept. 9, 1958 |